Figure 1:
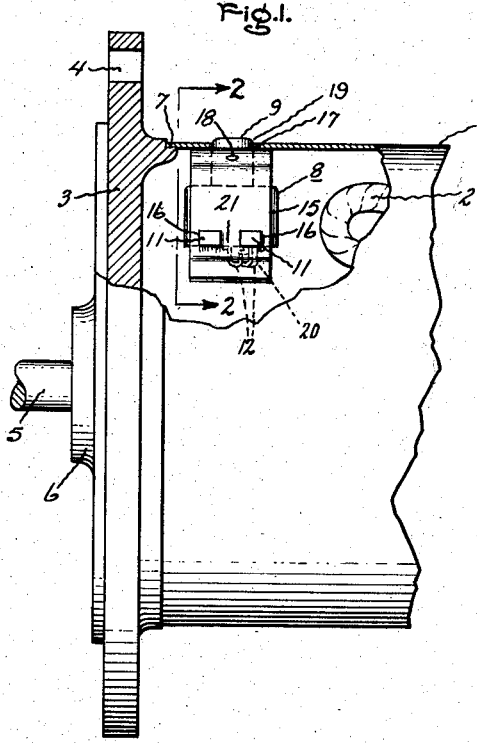

April 14, 1959     R. E. SEELY     2,882,002
MOTOR PROTECTOR BRACKET

Filed April 5, 1954

Inventor:
Richard E. Seely,
by *[signature]*
His Attorney.

United States Patent Office 2,882,002
Patented Apr. 14, 1959

2,882,002

MOTOR PROTECTOR BRACKET

Richard E. Seely, Fort Wayne, Ind., assignor to General Electric Company, a corporation of New York Application April 5, 1954, Serial No. 421,141

1 Claim. (Cl. 248—205)

This invention relates to motor protectors and more particularly to an improved means of securing such a protector to a motor.

Small electric motors frequently have protectors or overload cutouts mounted therein in order to provide inherent thermal protection. Such motor protectors have, in the past, generally been designed so that they might be threadedly mounted on a bracket which in turn would be secured to a stationary part of the motor. It will be seen that two time consuming operations are necessary: the mounting of the motor protector on the bracket; and the mounting of the bracket to a stationary part of a motor. Many such motor protectors are designed with two opposite projecting flanges with slot openings respectively formed therein so that screws may be inserted in the openings from the side thereof and then threaded into the bracket. In protectors of this type, the two remaining parts of each flange on each side of the screw opening are, as a result, in the form of short fingers extending outwardly away from the protector. To achieve time saving and economization in the manufacture of motors using such protectors it is clearly desirable to eliminate as many time consuming operations as possible. Included among such operations is the mounting of the protector in the bracket which in turn is to be affixed to a stationary part of the motor.

It is therefore an object of this invention to provide means for mounting a motor protector to a motor which will embody the desirable features set forth above.

Further objects and advantages of this invention will become apparent and the invention will be better understood by reference to the following description and the accompanying drawing, and the features of novelty which characterize this invention will be pointed out with particularity in the claim annexed to and forming a part of this specification.

This invention in its broadest aspects provides a bracket adapted to be secured to a motor frame by any desired means, such as welding, eyelets, or screws. An opening may be provided in the motor frame for manual operation of the protector or, if automatic operation is desired, the protector may be entirely within the frame. The mounting bracket is made from thin spring material and is provided with openings corresponding to the fingers projecting from the protector. The protector is mounted in the bracket merely by inserting the protector therein and pushing it inwardly until the fingers snap through the openings in the bracket. By this means the motor protector will be held securely in one position without fear of its being dislodged, in view of the fact that the only forces operating on the protector will be in a direction which is perpendicular to the direction in which the fingers fit through the openings.

Figure 2:
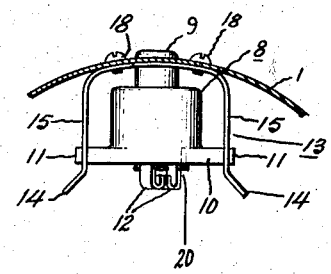

In the drawing,

Figure 1 is a fragmentary view, partly cut away and partly in cross section, of a motor in which a protector has been mounted by the improved means of this invention; and Figure 2 is a view along lines 2—2 of Figure 1.

Referring now to the drawing there is shown a motor frame 1 in which a motor (which is not shown except for a part of the end turns 2 of the winding) is mounted. The end of frame 1 is closed by an end shield 3 which is provided with a number of openings such as 4 by means of which it may be secured to an appropriate member. Projecting from end shield 3 is the shaft 5 which extends from the armature (not shown) of the motor and is suitably mounted in a bearing (not shown) within hub 6 of end shield 3. Frame 1 fits into end shield 3 by rabbets such as 7. It will be understood that the foregoing description is merely illustrative of one type of motor with which the invention may be used and that the improved mounting means is not to be restricted to such a structure.

A motor protector 8 is provided which has a manual reset button 9 extending therefrom whereby the device may be manually reset after it has opened due to excessive temperature or current. This mechanism may be of any standard construction and is not intended to be a part of the present invention. At the base of the protector 8 there is a flange 10 which terminates at each side in a pair of fingers 11 between which there is formed an opening 21 into which a screw has heretofore been placed so as to mount the protector 8 to a bracket. Protector 8 is provided with terminals 12 to which leads such as 20 may be secured in order that the protector be connected properly in the motor circuit.

A bracket, generally indicated at 13, is provided for mounting the protector 8 to the motor frame 1. This bracket is substantially U-shaped with the ends 14 of the legs 15 being flared outwardly. A pair of openings 16 are provided close to the end of each leg 15 and are so spaced that fingers 11 will snap therethrough when protector 8 is inserted in the bracket 13. Thus, it will be seen that it is merely necessary to press the protector 8 in past sloping surfaces 14, into the position shown in the figures. At this point the bracket will snap back toward its unbiased position. Fingers 11 will protrude through openings 16 and the protector will be firmly secured in the bracket. A circular opening 17 is provided in the top or bight portion of the bracket to accommodate the reset button 9 of the protector. The top of the bracket 13 is provided with the same curvature as frame 1 so as to lie flat thereagainst. The bracket 13 may then be secured to frame 1 by any desired means. In the embodiment shown the screws 18 have been used, but welding or the use of eyelets in lieu of the screws is deemed equally desirable.

In the present embodiment the protector is adapted for manual reset; therefore an opening 19 is provided in frame 1 and reset button 9 projects therethrough. It will be understood however, that if an automatic resetting type of protector is desired, the frame 1 and the bracket 13 need not have openings 17 and 19.

Another desirable feature which is present when the protector is mounted for manual reset is that the position of bracket 13 within frame 1 is such that only a very small amount of reset button 9 will project through the frame. This is desirable both for the sake of appearance and for protection of the protector mechanism 8.

It is clear from the above description that a mounting means has been provided for a motor protector which mounts it securely in place without fear of dislodgement and, at the same time, eliminates at least one time consuming operation by the provision of openings 16 through which finger 11 may snap instead of a threaded mounting between the bracket and the protector.

While this invention has been explained by describing the particular embodiments thereof, it will be apparent that improvements and modifications may be made without departing from the scope of the invention as defined in the appended claim.

What I claim as new and desire to secure by Letters Patent of the United States is:

In combination: a motor frame having an opening formed therethrough, an overload device having a pair of projecting members respectively formed on opposite sides thereof and a resetting button at one end thereof movable in a direction substantially perpendicular to said projecting members, and means for mounting said device to said frame comprising a U-shaped resilient metal strip having an opening formed near the end of each leg thereof, said projecting members extending through said openings respectively from within said strip thereby to maintain the device within said strip, the bight of said strip having an opening formed therein, said strip having said bight secured to said frame with said frame and bight openings respectively in alignment, said reset button projecting through said frame and bight openings.

References Cited in the file of this patent

UNITED STATES PATENTS

| | | |
|---|---|---|
| 1,285,802 | Russell | Nov. 26, 1918 |
| 2,469,451 | Burrus | May 10, 1949 |
| 2,470,318 | Nadelson | May 17, 1949 |
| 2,525,977 | Tinnerman | Oct. 17, 1950 |
| 2,673,334 | Julian | Mar. 23, 1954 |